(12) United States Patent
Etheridge

(10) Patent No.: X9450
(45) Date of Patent: Mar. 2, 1836

(54) MILL STONES, PICKS

(76) Inventor: Samuel Etheridge

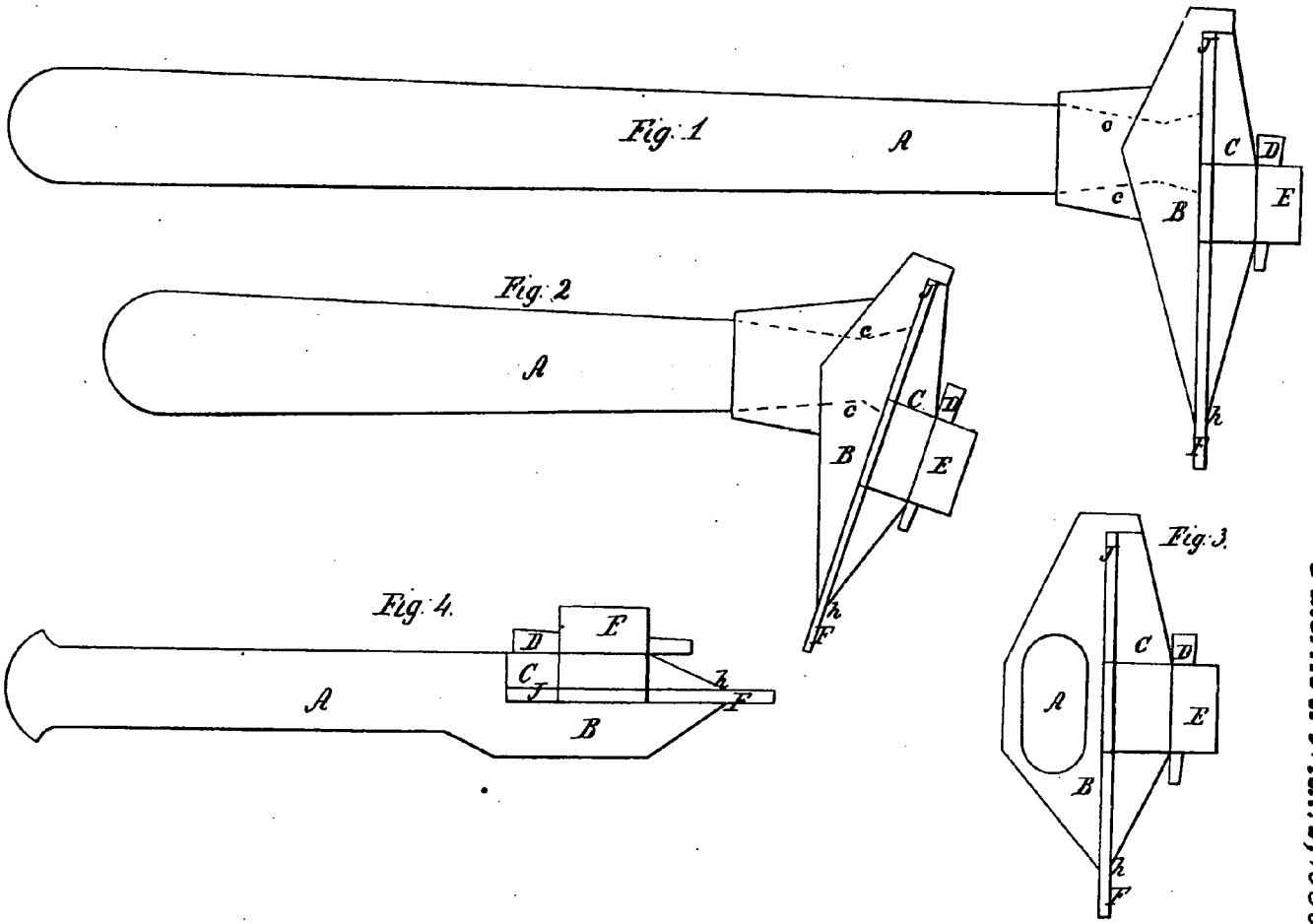

United States Patent Patent No.: X9450
S. Etheridge,
Stone- Working Chisel.
Patented Mar. 2, 1836.